(12) United States Patent
Teshima

(10) Patent No.: US 8,643,888 B2
(45) Date of Patent: Feb. 4, 2014

(54) IMAGE FORMING APPARATUS AND METHOD FOR CONTROLLING THE SAME

(75) Inventor: Katsunori Teshima, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 13/571,811

(22) Filed: Aug. 10, 2012

(65) Prior Publication Data

US 2013/0044355 A1    Feb. 21, 2013

(30) Foreign Application Priority Data

Aug. 16, 2011  (JP) ................................ 2011-178090

(51) Int. Cl.
*G06K 15/00*    (2006.01)
(52) U.S. Cl.
USPC ....... 358/1.16; 358/1.14; 358/1.15; 358/1.17; 358/1.9; 711/100; 711/102; 711/103; 711/104; 711/105; 711/147; 711/148; 711/161; 711/162
(58) Field of Classification Search
None
See application file for complete search history.

(56) References Cited

U.S. PATENT DOCUMENTS

| | | | |
|---|---|---|---|
| 5,611,069 A | 3/1997 | Matoba | |
| 7,124,094 B1 * | 10/2006 | Kobayashi et al. | 705/64 |
| 7,325,052 B1 * | 1/2008 | Motoyama | 709/223 |
| 8,060,781 B2 * | 11/2011 | Ishikawa et al. | 714/22 |
| 2009/0248998 A1 | 10/2009 | Sato et al. | |
| 2012/0268757 A1 * | 10/2012 | Honma | 358/1.9 |

FOREIGN PATENT DOCUMENTS

| | | |
|---|---|---|
| JP | 07-129331 A | 5/1995 |
| JP | 2001-243022 A | 9/2001 |
| JP | 2009-104369 A | 5/2009 |
| JP | 2009-230608 A | 10/2009 |
| JP | 2010-198424 A | 9/2010 |
| JP | 2010-277240 A | 12/2010 |

OTHER PUBLICATIONS

Japanese Office Action dated Oct. 1, 2013 (and English translation thereof) in counterpart Japanese Application No. 2011-178090.

* cited by examiner

*Primary Examiner* — Hilina K Demeter
(74) *Attorney, Agent, or Firm* — Holtz, Holtz, Goodman & Chick, PC

(57) ABSTRACT

Disclosed is an image forming apparatus including: at least three storing devices; a detecting unit; and a control unit, wherein the striping is carried out by using all of the storing devices, and the mirroring is carried out by using at least two of the storing devices except at least one storing device. When one of the storing device is failed, in case that the mirroring was carried out by using the failed storing device, the mirroring is continued by using the one storing device which is not used for carrying out the mirroring instead of the failed storing device. The striping is carried out by using all of the storing devices except the failed storing device.

12 Claims, 9 Drawing Sheets

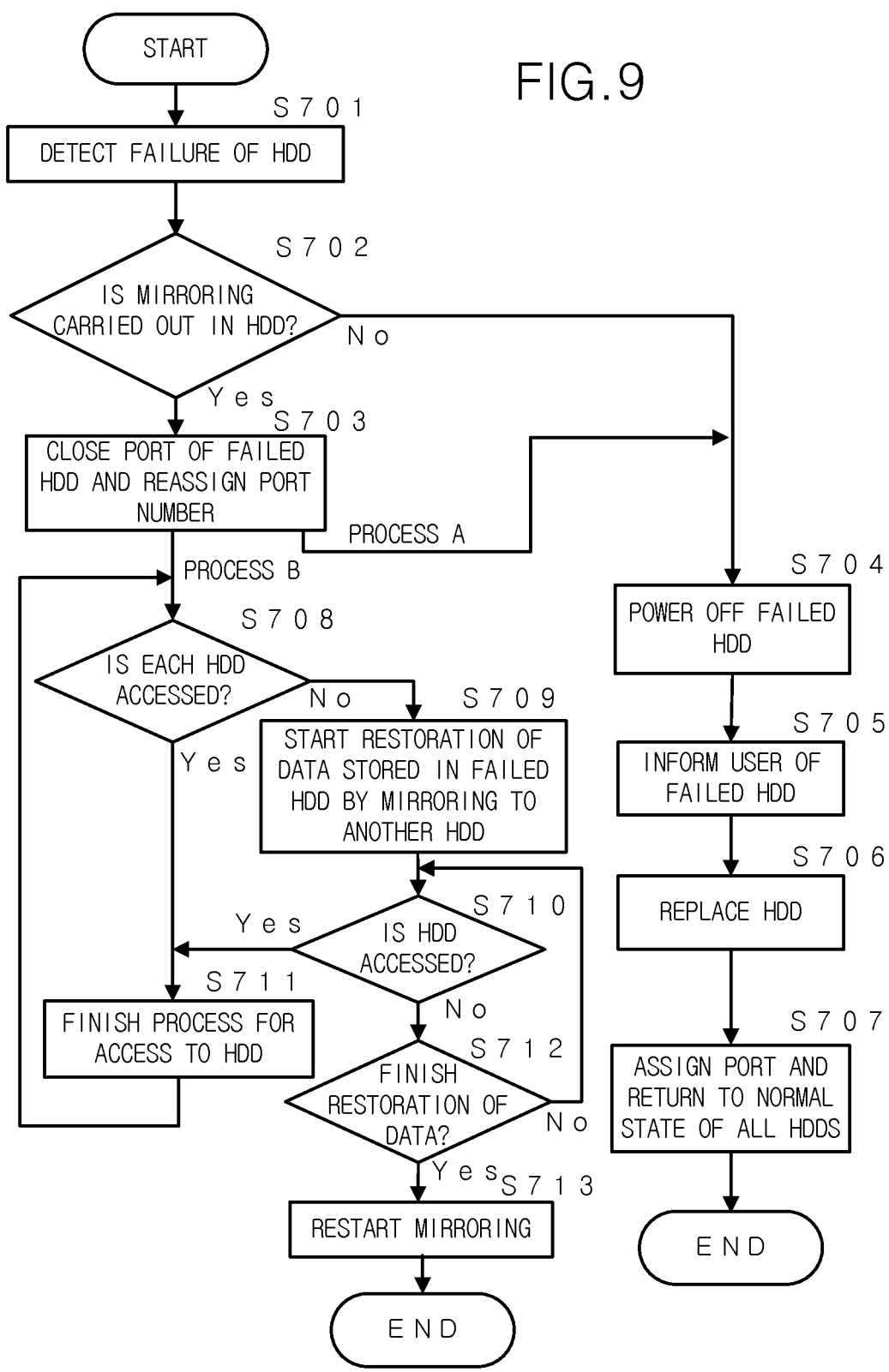

IMAGE FORMING APPARATUS AND METHOD FOR CONTROLLING THE SAME

BACKGROUND OF THE INVENTION

1. Field of the Invention

The present invention relates to an image forming apparatus and the method for controlling the image forming apparatus, in particular, the image forming apparatus using the RAIDs (Redundant Arrays of Inexpensive Disks) and the method for controlling the above image forming apparatus.

2. Description of Related Art

Conventionally, in many cases, a storing device stores data by using one HDD (Hard Disk Drive). However, because the HDD has movable parts, the failure easily occurs in the HDD due to the deterioration of the movable parts or the like. Therefore, when the failure occurs, there is some possibility that all of the stored data are lost. Further, in the HDD, the access speed for accessing data is slow as compared with a semiconductor memory.

In order to safely store data and to read and write data at a high speed, the method called as RAID in which a plurality of HDDs are used, has been proposed. In the RAID, there are a plurality of levels and the effects are different according to the levels. For example, the RAID0 classified as level 0, is the method in which data can be read and written at a high speed by dispersively storing data in a plurality of HDDs. The RAID1 classified as level 1, is the method in which the same data is written in a plurality of HDDs to enhance the fault tolerance. The RAID has been used in a large-scale business server or a workstation which is required to process a large quantity of data at a high speed and to enhance the fault tolerance and in a computing device or the like which is manufactured for a specific purpose. In recent years, the RAID has been used in a multi-function peripheral or the like.

However, in each of the above RAIDs, there are some problems. In the RAID0 (striping), it is possible to read and write the data at a high speed by using the RAID0, however, when one HDD is failed, all of the data cannot be used (that is, the RAID0 has no fault tolerance). In the RAID1 (mirroring), it is possible to enhance the fault tolerance by using the RAID1, however, because the same data is stored in a plurality of HDDs, the redundant data are caused in proportion to the number of HDDs used for the mirroring and the writing speed becomes slow.

Further, various types of data are stored in the storing device. In case of the data which is frequently accessed, it is considered that the reading and writing speed is more important than the fault tolerance. On the other hand, in case of the data that is intended to be stored, it is considered that the fault tolerance is more important than the reading and writing speed. Therefore, in the storing device for storing the data by using the RAID0 or the RAID1, there was a problem in which various types of data cannot be effectively stored.

In order to solve the above problem, the following storing device is proposed. In the storing device, by using a plurality of HDDs in which the RAID can be carried out, it is possible to read and write the data at a high speed and to improve the fault tolerance according to the type of data (See Japanese Patent Application Publication No. 2010-198424).

In the method disclosed in the above Japanese Patent Application Publication, it is possible to read and write the data at a high speed and to improve the fault tolerance according to the type of data. However, in the above publication, it is not specifically disclosed how to cope with the failure of the storing device since the HDD is failed until the failed HDD is replaced. For example, in case that two HDDs are provided, when one HDD is failed, the mirroring cannot be carried out until the failed HDD is replaced with new one. As a result, the fault tolerance is lost. Further, while only one HDD is actuated, it is not possible to carry out the striping. Therefore, it takes a long time to read and write the data as compared with the case in which the striping is carried out by using a plurality of HDDs. Further, in a multi-function peripheral or the like in which the above technology is diverted, the productivity is decreased when the above situation is caused.

SUMMARY

To achieve at least one of the abovementioned objects, an image forming apparatus reflecting one aspect of the present invention comprises:

at least three storing devices which are hard disk drives or solid state drives;

a detecting unit to detect a failure of one of the storing devices or to expect an occurrence of the failure of one of the storing devices; and a control unit to control a storage of data in the storing devices, wherein in each of all of the storing devices, a first storing area for storing the data in a division storing method in which the data is divided into blocks and the blocks are dispersively stored in all of the storing devices, is secured, in each of at least two of the storing devices except at least one storing device, a second storing area for storing the data in a redundant storing method in which the data is redundantly stored in the two of the storing devices, is secured, and the control unit stops the storing device in which the failure is detected or the occurrence of the failure is expected by the detection unit, after the storing device is stopped, the control unit carries out the storage of the data in the division storing method by using all of the storing devices except the stopped storing device, in case that the stopped storing device is a storing device for storing the data in the redundant storing method, the control unit secures the second storing area in the one storing device which is not the stopped storing device and in which the data is not stored in the redundant storing method, the control unit copies the data stored in the second storing area of the storing device which is not the stopped storing device and in which the data is stored in the redundant storing method, to the secured second storing area of the one storing device, and after the data is copied, the control unit carries out the storage of the data in the redundant storing method by using the secured second storing area of the one storing device and the second storing area of the storing device which is not the stopped storing device and in which the data is stored in the redundant storing method.

Preferably, when the control unit stops the storing device in which the failure is detected or the occurrence of the failure is expected by the detection unit, the control unit powers off only the storing device to be stopped so as to be replaceable with a new storing device even while the image forming apparatus is activated.

Preferably, each priority number is assigned to each of the storing devices in which the second storing area is secured, and the control unit reads the data stored in the redundant storing method from the second storing area of the storing device to which a highest priority number is assigned.

Preferably, when the control unit secures the second storing area in the one storing device in which the data is not stored in the redundant storing method, the control unit assigns a lowest priority number among the priority numbers to be assigned, to the one storing device.

Preferably, the image forming apparatus further comprises: an informing unit to inform a user of the detected failure of the storing device or the expected occurrence of the failure when the failure of the storing device is detected or the occurrence of the failure of the storing device is expected by the detection unit.

Preferably, the control unit copies the data stored in the second storing area when access to the storing device is not carried out except the access for copying the data.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 9 is a flowchart showing all of the processes to be carried out since the failure of the HDD is detected.

DETAILED DESCRIPTION OF PREFERRED EMBODIMENTS

Hereinafter, a preferred embodiment of the present invention will be explained with reference to the accompanying drawings.

Figure 1:
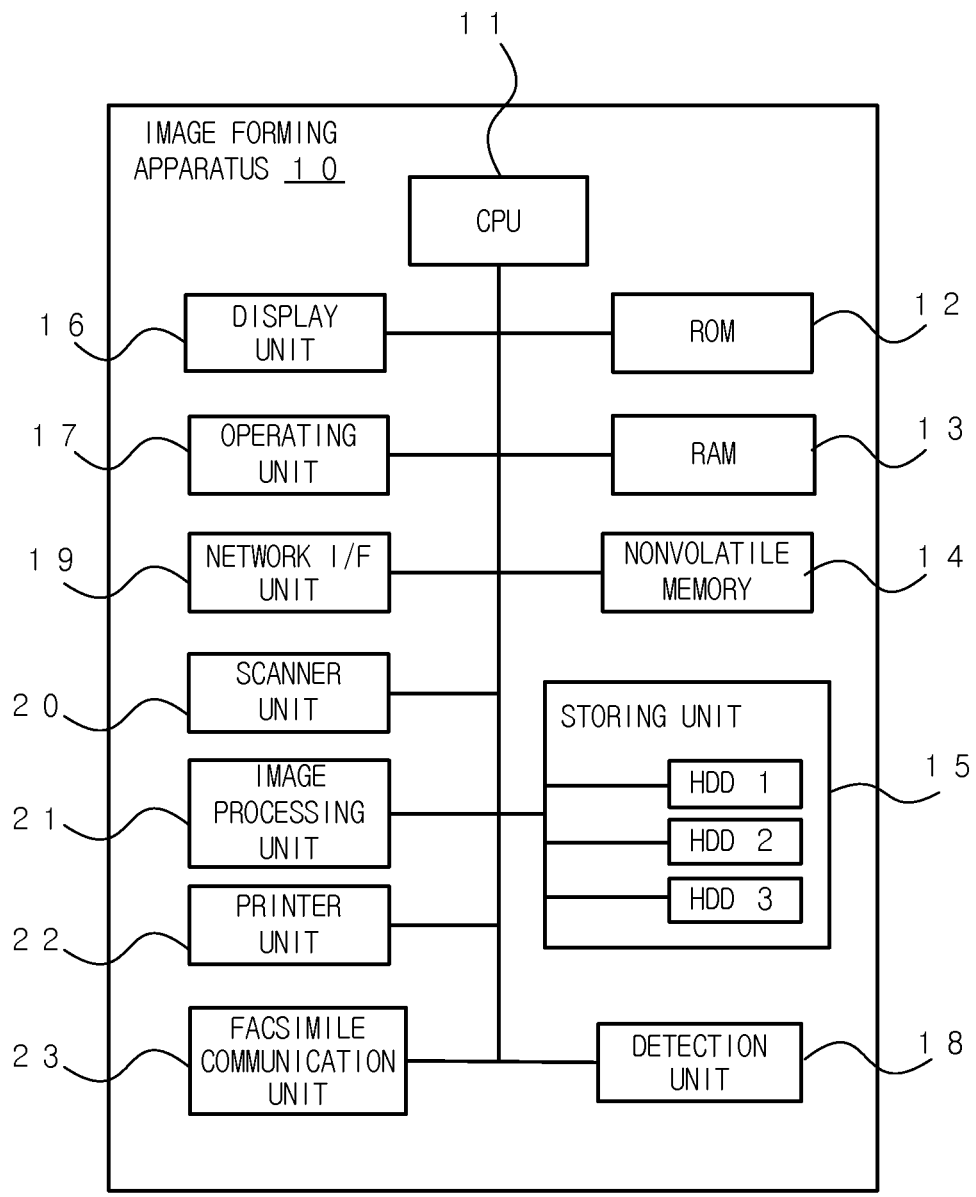
FIG. 1 a block diagram showing a schematic configuration of the image forming apparatus according to the embodiment.

FIG. 1 shows the schematic configuration of the image forming apparatus 10 according to the embodiment. The image forming apparatus 10 comprises a CPU (Central Processing Unit) 11 for controlling the operation of the image forming apparatus 10, a ROM (Read Only Memory) 12, a RAM (Random Access Memory) 13, a nonvolatile memory 14, a storing unit 15 having three HDDs (HDD1, HDD2 and HDD3), a display unit 16, an operating unit 17, a detection unit 18, a network I/F unit 19, a scanner unit 20, an image processing unit 21, a printer unit 22 and a facsimile communication unit 23, which are connected with the CPU 11.

By the CPU 11, a middleware, application programs and the like are executed on an OS (Operating System) program as a base. In the ROM 12, various types of programs are stored. By executing the processes by the CPU 11 in accordance with these programs, the functions of the image forming apparatus 10 are realized. The RAM 13 is used as a work memory for temporarily storing various data when the CPU 11 executes the process in accordance with the programs and as an image memory for storing image data.

The nonvolatile memory 14 is a rewritable memory (flash memory) in which the contents are stored even if the image forming apparatus 10 is powered off. In the nonvolatile memory 14, the settings of the PORT numbers are stored in addition to the unique information of the apparatus and various types of setting information.

The storing unit 15 is configured as one virtual hard disk by combining a plurality of HDDs which are large-capacity nonvolatile storing devices. In the HDDs, an OS program, various types of application programs, print data, image data, a job history, a setting history and the like are stored. In this embodiment, as a method for using the HDDs, the RAID0 (a division storing method for dividing the data into the blocks and dispersively storing the blocks in a plurality of HDDs; striping) and the RAID1 (a redundant storing method for redundantly storing the data in a plurality of HDDs; mirroring) are adopted. In each of the HDD1 to the HDD3, a switch for the power on/off of each HDD is provided. The CPU 11 controls the power on/off of each HDD.

The display unit 16 is configured by a liquid crystal display (LCD) or the like, and has a function to display various type of operation windows, setting windows and the like. The operating unit 17 has a function to receive various types of operations, such as jobs, settings and the like, from a user. The operating unit 17 comprises a touch panel which is provided on the screen of the display unit 16. The touch panel detects a coordinate position in which the user pushes down. Further, the operating unit 17 comprises a numerical keypad, an alphabetical keypad, a start key for starting the print, and the like.

The detection unit 18 has a function to detect the failure of the HDD provided in the storing unit 15 and has a function to expect the occurrence the failure of the above HDD (detect that the HDD is failed soon). For example, the detection unit 18 has the above function by detecting the trouble or the deterioration situation of the HDD from the value information (SMART information) obtained from the SMART (Self-Monitoring Analysis and Reporting Technology) installed in the HDDs.

The network I/F unit 19 communicates with another external device which is connected with the image forming apparatus 10 via a network, such as LAN (Local Area Network).

The scanner unit 20 has a function to obtain the image data by optically reading an original. For example, the scanner unit 20 comprises a light source for irradiating the original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The image processing unit 21 carries out the rasterization processing for converting print data into image data, compression/decompression processing of image data and the like, in addition to the processings, such as enlargement/reduction and rotation of the image.

The printer unit 22 has a function to form an image based on image data, on recording paper. In this embodiment, the printer unit 22 is configured as the so-called laser printer for forming an image by the electrophotographic process. The laser printer comprises a conveying device for the recording paper, a photoconductive drum, a charging device, a laser unit, a developing device, a transfer and separation device, a cleaning device and a fixing device. The image may be formed by the inkjet system or another system.

The facsimile communication unit 23 controls the operation relating to the facsimile transmission and the facsimile reception.

In the image forming apparatus 10, both of the RAID0 (striping) and the RAID1 (mirroring) are used. In the striping, the data is divided into the blocks and the blocks are dispersively written in a plurality of HDDs and read from a plurality of HDDs. By the striping, it is possible to speed up the process for the data. However, because the striping has no fault tolerance, the striping is not suitable for storing an important data.

In the mirroring, the data having the same contents is written in a plurality of HDDs at the same time. Thereby, it is possible to obtain the high fault tolerance. By carrying out the mirroring, the data can be avoided from being lost due to the failure of the HDD. However, because the data having the same contents is redundantly written, it takes a long time to carry out the process as compared with the normal writing.

When each data is stored, the CPU 11 judges whether the processing speed is emphasized or not and/or whether the fault tolerance is emphasized or not. Then, the CPU 11 carries out either the striping (division storing method) or the mirroring (redundant storing method) according to each data and stores the data. In this embodiment, the job data is stored in the striping area because the image is output in real time. For example, in case of the copy job, the image data obtained by reading the original by the scanner unit 20 is sequentially written in the storing unit 15 by the striping and the image data is sequentially read out from the storing unit 15 to print the image by the printer unit 22. In the image data used in the copy job, because the image is instantly printed out, it is only necessary to be temporarily stored. Further, because the image data is read and written in real time in synchronization with each operation of the scanner unit 20 and the printer unit 22, it is required to process the data at a high speed. On the other hand, in case of the job ticket and the like, because it is required to reliably store the data, the data is stored in the mirroring area.

Figure 2:
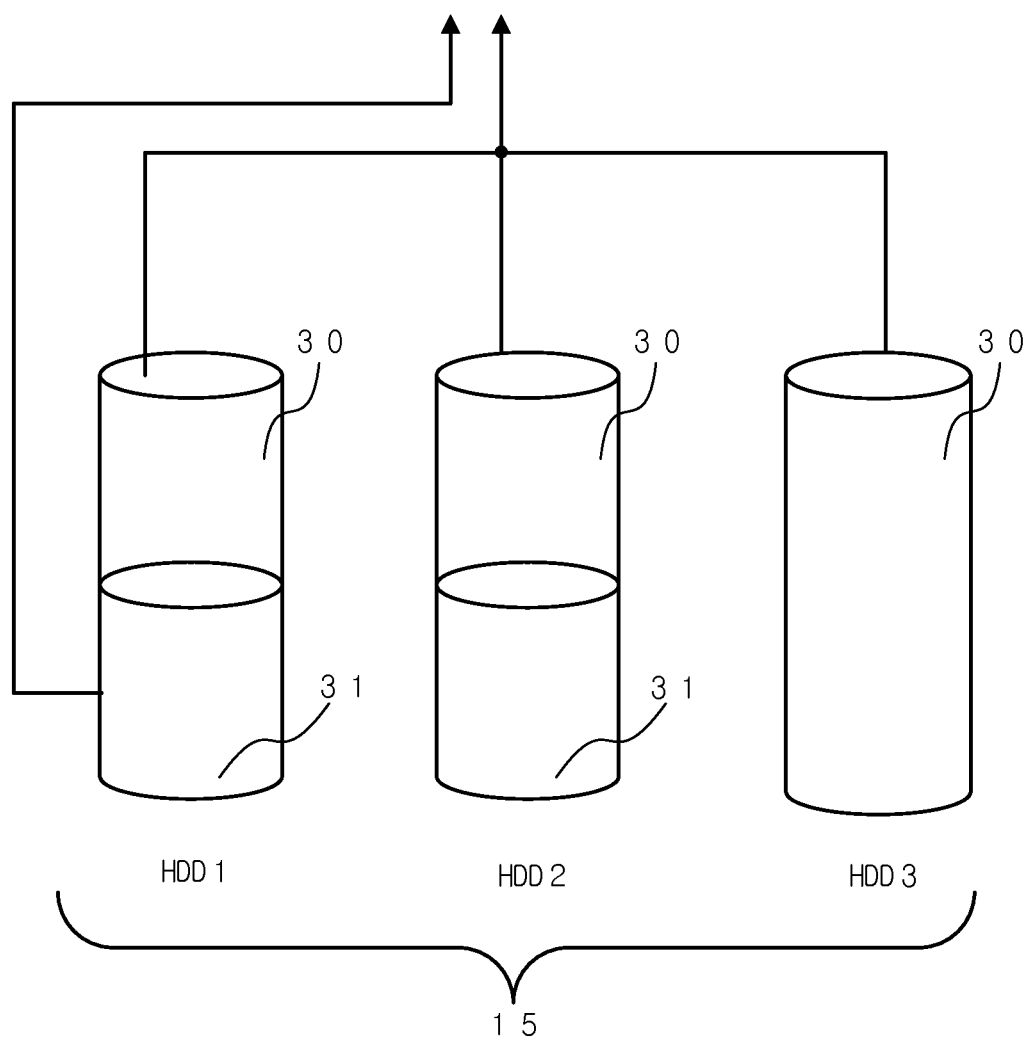
FIG. 2 is an explanatory view showing the situation in which three HDDs are actuated.

FIG. 2 is an explanatory view showing the situation in which the data are stored by the striping and the mirroring in three HDDs (HDD1, HDD2 and HDD3) of the storing unit 15 provided in the image forming apparatus 10.

Figure 3:
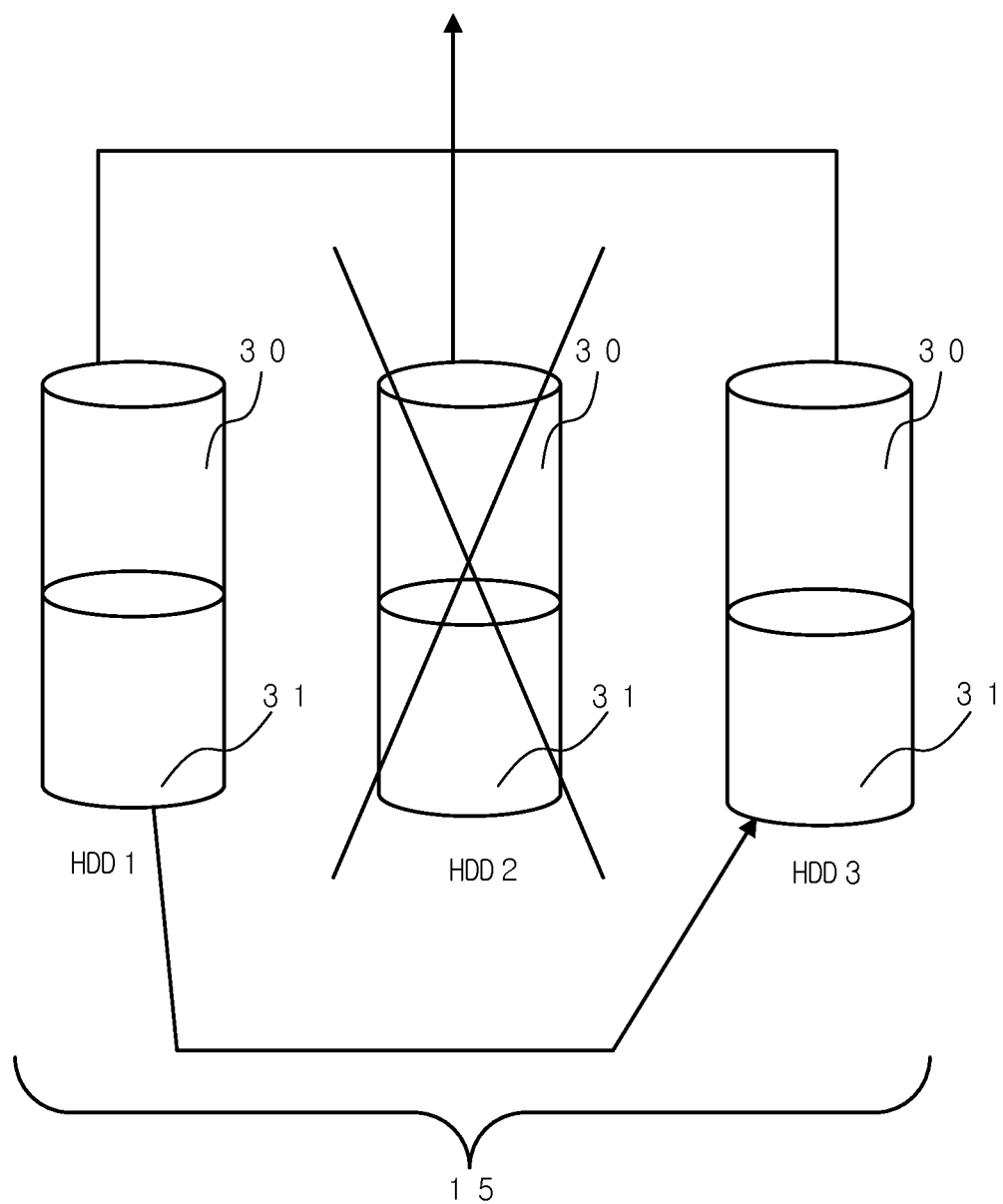
FIG. 3 is an explanatory view showing the situation in which one of three HDDs is failed.

In each of three HDDs (HDD1, HDD2 and HDD3), the striping area 30 for storing the data which is written by the striping is secured. In the striping area 30, the data which has no problem even if the data is lost, is stored. In the HDD1 and the HDD2, the data is stored by the mirroring. Therefore, each of the HDD1 and the HDD2 has the mirroring area 31 for storing the data which is written by the mirroring. In the mirroring area 31, the data, such as the setting contents for the image forming apparatus 10, is stored because the fault tolerance is emphasized. In FIG. 3, in case that the data is stored in each mirroring area 31 of the HDD1 and HDD2, the image forming apparatus 10 is set so as to preferentially read out the data stored in the HDD1. The above setting will be explained later.

The mirroring may be carried out in three HDDs. In case that the number of the HDDs in which the mirroring is carried out is increased, the fault tolerance is enhanced. However, the redundancy of the data is increased in proportion to the number of the above HDDs, and it takes a long time to process the data. Therefore, it is preferable that the mirroring is carried out by using two HDDs in consideration of the balance between the fault tolerance and the processing speed.

FIG. 3 shows the situation in which the HDD2 of FIG. 2 is failed. By the failure of the HDD2, the normal HDD having the mirroring area 31 is only the HDD1. Therefore, the mirroring cannot be carried out.

In the HDD3 in which the mirroring is not carried out, the mirroring area 31 is newly secured. In the secured mirror area 31, the data stored in the mirroring area 31 of the HDD1 is copied. Then, the mirroring area 31 of the HDD3 is used as the replacement mirroring area instead of the mirroring area 31 of the HDD2 and the mirroring is carried out by using the HDD1 and HDD3. The striping is continued in only the HDD1 and the HDD3.

Thereafter, the CPU 11 controls the storing unit 15 so as to power off only the HDD2, and informs the user of the failure of the HDD2. At this time, in the state that the image forming apparatus 10 remains powered on, the HDD2 can be replaced. Because the striping and the mirroring are carried out by using the HDD1 and the HDD3, the image forming apparatus 10 can suppress the deterioration of the productivity during the execution of the jobs, such as a scan job and maintain the fault tolerance of the storing unit 15 until the failed HDD2 is replaced with a new HDD.

Figure 4:
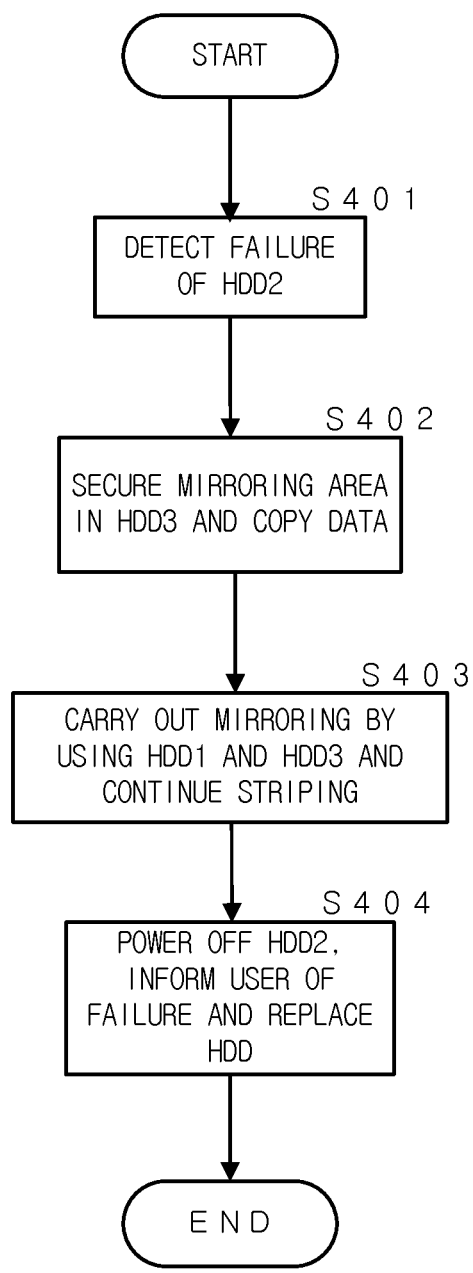
FIG. 4 is a flowchart showing the process to be carried out by the image forming apparatus when the situation of FIG. 3 is caused.

FIG. 4 shows the flowchart of the process which is carried out until the failed HDD shown in FIG. 3 is replaced.

When the detection unit 18 detects the failure of the HDD2 (Step S401), the CPU 11 secures a new mirroring area 31 in the HDD3. Further, the CPU 11 copies the data stored in the mirroring area 31 of the HDD1 to the newly secured mirroring area 31 (Step S402). When the above copy is finished, the mirroring and the striping are continued by using the HDD1 and HDD3 (Step S403). Further, the CPU 11 powers off the HDD2 and informs the user of the failure of the HDD. Then, the CPU 11 receives the replacement of HDD, which is carried out by the user (Step S404) and the process is ended.

As shown in FIG. 3, the image forming apparatus 10 is set so as to preferentially read out the data stored in the HDD1 among the data stored in each mirroring area 31. In a conventional technology, when the image forming apparatus 10 reads the data stored by the mirroring, the image forming apparatus 10 selects the HDD to which the PORT having the smallest PORT number is assigned and reads the data stored in the selected HDD. The PORT is an interface for inputting/outputting the data which are communicated between each HDD and the image forming apparatus 10. The PORT number is an identification number which is previously assigned to each PORT. The assignment of the PORT number to the HDD means that the PORT with which the HDD is interfaced (connected) is determined. For example, when the PORT having the number of 1 is assigned to the HDD1, the data are readout from and written in the HDD1 via the PORT1. In this embodiment, in case that the PORT number is reassigned, for example, when the HDD connected with the PORT2 selected from among the PORT1, the PORT2 and the PORT3 is failed, the PORT2 is reassigned to the HDD to which the PORT3 is assigned. When the HDD which is connected with the PORT1 is failed, the PORT1 is reassigned to the HDD which is connected with the PORT2 and the PORT2 is reassigned to the HDD which is connected with the PORT3. As described above, when the PORT numbers are reassigned, the port numbers are always reassigned to the required PORTs in order from the smallest PORT number. Then, when the data stored by the mirroring are read, the data are read from the HDD connected with the PORT having the smallest PORT number.

Figure 5:
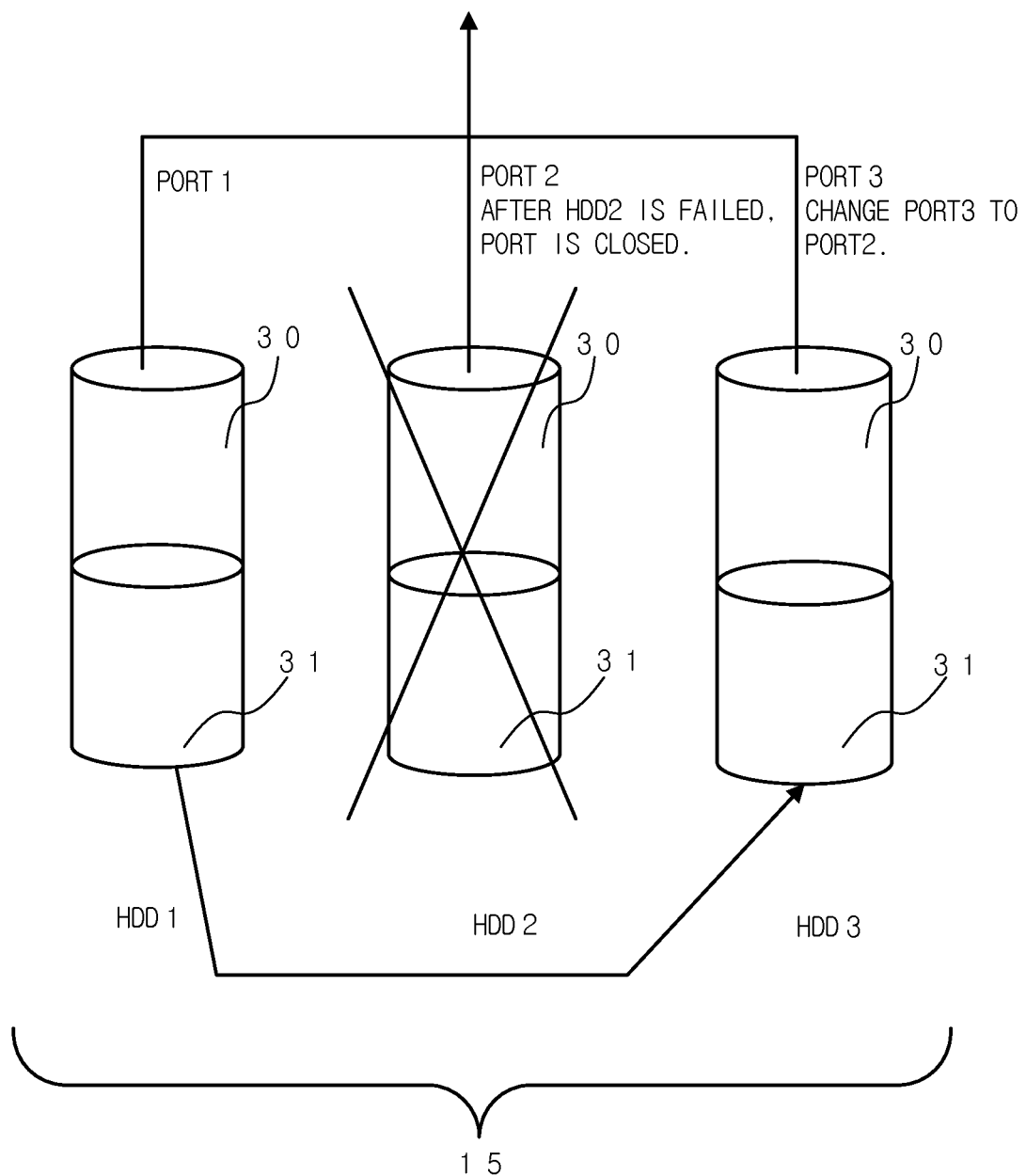
FIG. 5 is an explanatory view showing the situation in which the HDD to which PORT2 is assigned is failed among three HDDs.

FIG. 5 shows the situation in which when the PORT having the PORT number of 1 (PORT1) is assigned to the HDD1, the PORT having the PORT number of 2 (PORT2) is assigned to the HDD2 and the PORT having the PORT number of 3 (PORT3) is assigned to the HDD3, the HDD2 is failed. When the HDD2 is failed, the PORT with which the HDD2 is connected is closed. Then, the PORT having the PORT number of 2 is reassigned to the HDD3 (that is, the PORT number of the PORT with which the HDD3 is connected is changed from the PORT3 to the PORT2).

Figure 6:
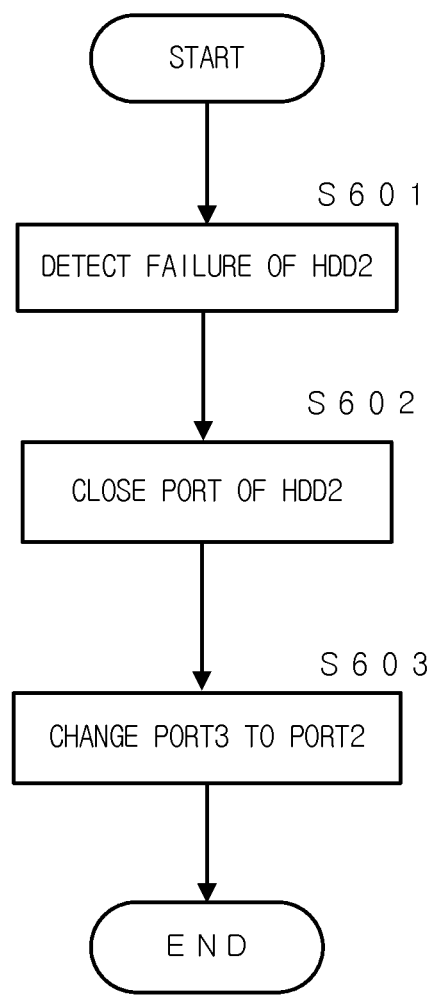
FIG. 6 is a flowchart showing the process for the reassignment of the PORT number, which is carried out when the situation of FIG. 5 is caused.

FIG. 6 shows the flowchart of the process which is carried out until the PORT number of the PORT which is assigned to the HDD3 is changed as shown in FIG. 5. When the detection unit 18 detects the failure of the HDD2, the operation is started (Step S601). Then, the PORT with which the HDD2 is connected is closed (Step S602). The PORT number of the PORT with which the HDD3 is connected is changed from the PORT3 to the PORT2 (Step S603). The process is ended.

Figure 7:
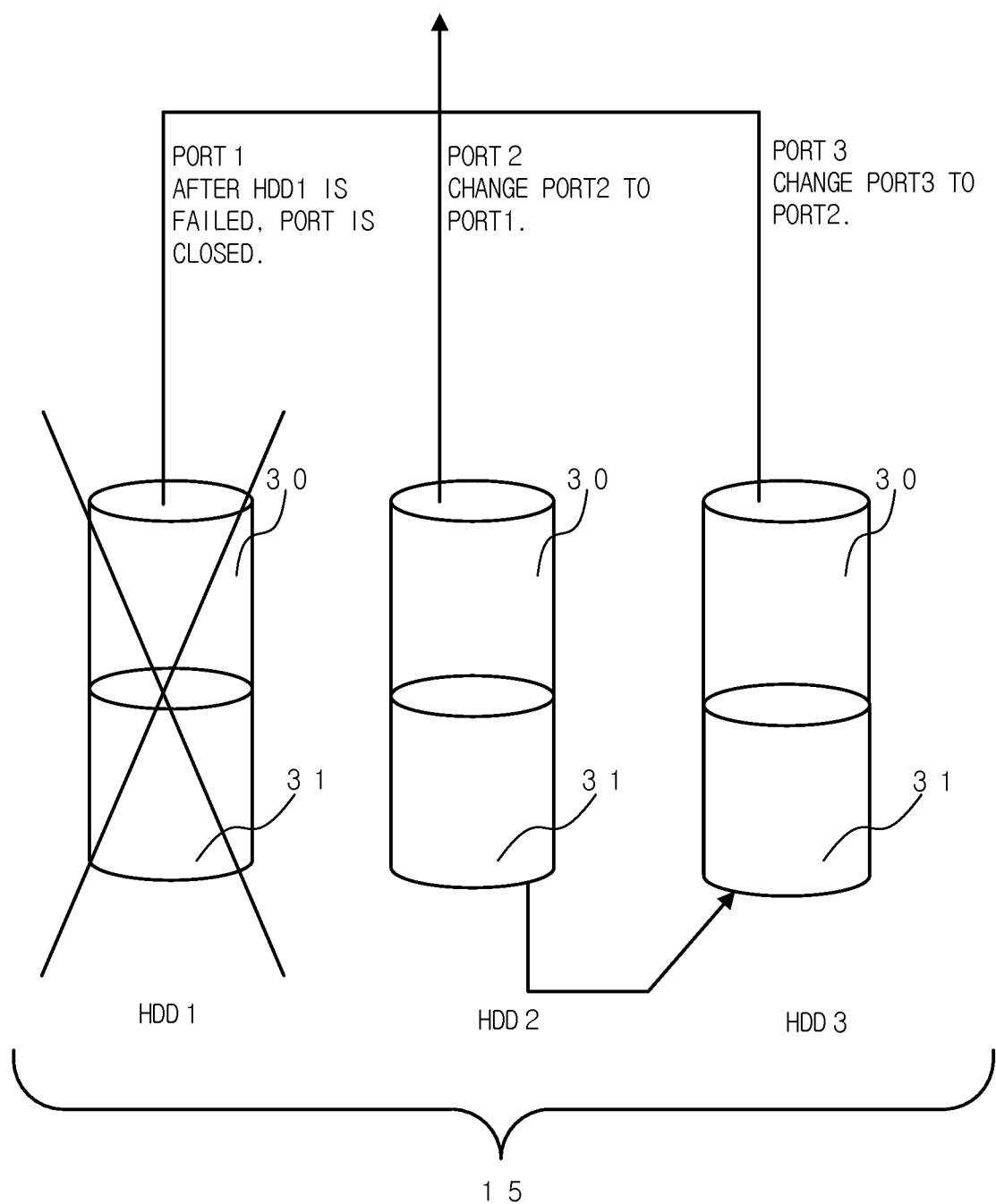
FIG. 7 is an explanatory view showing the situation in which the HDD to which PORT1 is assigned is failed among three HDDs.

FIG. 7 shows the situation in which when the PORT having the PORT number of 1 (PORT1) is assigned to the HDD1, the PORT having the PORT number of 2 (PORT2) is assigned to the HDD2 and the PORT having the PORT number of 3 (PORT3) is assigned to the HDD3, the HDD1 is failed. When the HDD1 is failed, the PORT with which the HDD1 is connected is closed. Then, the PORT number of the PORT with which the HDD2 is connected is changed from the PORT2 to the PORT1. Further, the PORT number of the PORT with which the HDD3 is connected is changed from the PORT3 to the PORT2.

In FIG. 7, because the failed HDD is the HDD1, the mirroring area 31 is secured in the HDD3. The CPU 11 copies the data stored in the mirroring area 31 of the HDD2 to the secured mirroring area 31 of the HDD3. Then, the mirroring and the striping are continued by using the HDD2 and the HDD3.

Figure 8:
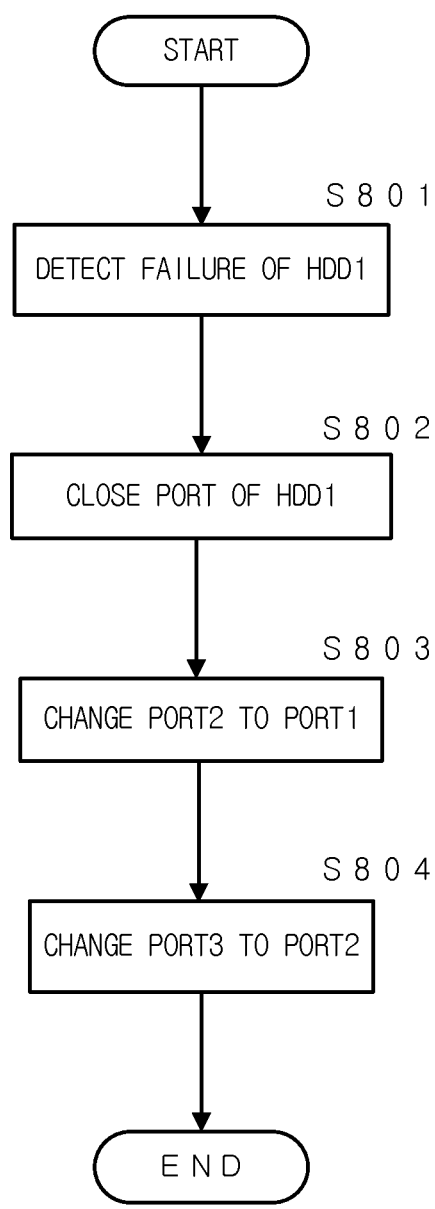
FIG. 8 is a flowchart showing the process for the reassignment of the PORT numbers, which is carried out when the situation of FIG. 7 is caused.

FIG. 8 shows the process which is carried out until the PORT numbers of the PORTs which are assigned to the HDD2 and the HDD3 are changed.

When the detection unit 18 detects the failure of the HDD1, the operation is started (Step S801). Then, the PORT with which the HDD1 is connected is closed (Step S802). The PORT number of the PORT with which the HDD2 is connected is changed from the PORT2 to the PORT1 (Step S803). The PORT number of the PORT with which the HDD3 is connected is changed from the PORT3 to the PORT2 (Step S804). The process is ended.

FIG. 9 shows the process which is carried out until the PORT numbers are reassigned and the failed HDD is replaced in case that the HDD provided in the image forming apparatus 10 is failed.

When the detection unit 18 detects the failure of the HDD (Step S701), the CPU 11 judges whether the HDD in which the failure is detected is used for carrying out the mirroring (Step S702). In case that the HDD in which the failure is detected is not used for carrying out the mirroring (Step S702; No), the process proceeds to Step S704. In case that the HDD in which the failure is detected is used for carrying out the mirroring (Step S702; Yes), the PORT which is assigned to the failed HDD is closed. Then, the reassignment of the PORT numbers is carried out (Step S703). For example, in case that there are three HDDs, the process shown in FIG. 4 or FIG. 6 is carried out as the reassignment of the PORT numbers.

When the process shown in Step S703 is finished, the process proceeds to Step S704 (process A) and Step S708 (process B). The process A and the process B are carried out in parallel.

<Process B>

The CPU 11 judges whether each HDD is accessed (Step S708). When each HDD is not accessed (Step S708; No), the mirroring area 31 is newly secured in the HDD which is not used for carrying out the mirroring. Then, the restoration of the data stored in the failed HDD which is used for carrying out the mirroring is started (Step S709). That is, the operation for copying the data stored in the mirroring area 31 of the HDD which is used for carrying out the mirroring except the failed HDD to the newly secured mirroring area 31, is started. In case that the HDD is accessed during the restoration of the data (Step S710; Yes), the restoration is temporarily stopped. After the process for accessing the HDD is finished (Step S711), the process returns to Step S708 and is continued. In case that the HDD is not accessed during the restoration of the data (Step S710; No), the CPU 11 judges whether the restoration of the data is finished or not (Step S712).

When the restoration of the data is not finished (Step S712; No), the process returns to Step S710 and is continued. When the restoration of the data is finished (Step S712; Yes), the mirroring is restarted by using the HDD in which the data are restored and the HDD in which the original data used for the restoration of the data are stored (Step S713). Then, the process B is ended.

<Process A>

In Step S704, the CPU 11 powers off the HDD of which the failure is detected (Step S704). Then, the CPU 11 informs the user that the failure of the HDD is detected (Step S705) and receives the replacement of the failed HDD (Step S706). When the HDD is replaced, the CPU 11 assigns the PORT having the lowest priority PORT number to a new HDD (in case that the number of the HDDs is three, the lowest priority PORT number is PORT3). All of the HDDs including the new HDD return to the state in which the striping can be carried out by using all of the HDDs (Step S707). The process is ended. When the HDD is replaced, it is not necessary to change the settings relating to the mirroring.

In the embodiment, the image forming apparatus 10 comprises at least three HDD in which the striping and the mirroring can be carried out. Thereby, even though one HDD is failed, the mirroring and the striping are carried out by using the remaining HDDs. Therefore, even though the failed HDD is not instantly replaced, the image forming apparatus 10 can be used so as to maintain the fault tolerance and to suppress the deterioration of the speed for reading/writing data.

Further, when the failed HDD is replaced, it is not necessary to power off the whole of the image forming apparatus 10. By powering off the HDD to be replaced, it is possible to replace the HDD even while the image forming apparatus 10 is activated.

When the data stored by the mirroring are used, the HDD which is preferentially used is determined by using the PORT number. As a result, the difference in the degree of the deterioration between the HDDs becomes large. Therefore, it is possible to lengthen the time period which elapses since one HDD is failed until next one HDD is failed and to prevent a plurality of storing devices from being successively failed.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In the embodiment, when the detection unit 18 detects the failure of the HDD, the process for coping with the failure of the HDD is started. However, in case that the detection unit 18 expects the occurrence of the failure of the HDD, the same process for coping with the failure may be started.

In the embodiment, the storing devices provided in the storing unit 15 are HDDs. As long as the striping and the mirroring can be carried out, another subsidiary storing medium can be used. For example, SSDs (Solid State Drive) or the like can be used. Further, a storing device which is configured by combining the HDDs and the SSDs can be used.

In the embodiment, the PORT number is adopted as the priority number which is assigned to the storing device. The priority number is not limited to this.

In the embodiment, the number of the HDDs is three. However, the number of the HDDs is three or more. In this case, the mirroring is carried out by using at least two or more HDDs except one or more HDDs among three or more HDDs. As compared with the case in which the mirroring is carried out by using all of the HDDs from the beginning, the data writing speed in the mirroring is fast. Further, the deterioration of the HDDs, which is caused by reading and writing the data, can be suppressed.

One of the objects of the above embodiment is to provide an image forming apparatus and a method for controlling the image forming apparatus, which can continue the execution of the jobs so as to maintain the fault tolerance and to suppress the deterioration of the productivity even though one of the HDDs is failed.

In the above embodiment, the image forming apparatus comprises at least three storing devices (HDDs or SSDs) in which the RAID0 (striping, the division storing method) and the RAID1 (mirroring, the redundant storing method) can be carried out. In the image forming apparatus, the striping is carried out by using all of the storing devices and the mirroring is carried out by using at least two of the storing devices except at least one storing device. Then, when one of the storing devices is failed, in case that the failed storing device is the storing device for carrying out the mirroring, the mirroring is continued by using the storing device in which the mirroring is not carried out, instead of the failed storing device. The striping is continued by using all of the storing devices except the failed storing device. Therefore, it is possible to continue the execution of jobs so as to maintain the fault tolerance without deteriorating the productivity extremely. In case that the failed storing device is the storing device in which the mirroring is not carried out, the mirroring is carried out as before the storing device is failed.

In the above embodiment, when the storing device in which the failure is detected or the occurrence of the failure is expected by the detection unit is replaced, it is possible to replace the above storing device by powering off only the storing device to be replaced without powering off the whole of the image forming apparatus. Therefore, even while the storing device is replaced, the image forming apparatus can continue to be activated.

In the above embodiment, when the data which are redundantly stored are read, the storing device is designated as the reading destination in accordance with the priority numbers which are assigned to the storing devices. By assigning the priority number, when the data which are redundantly stored are read, the data are read from only the specific storing device having the high priority and not read from the other storing devices. As a result, the difference in the degree of the deterioration between the storing devices can be caused. Therefore, it is possible to lengthen the time period which elapses since one storing device is failed until next one HDD is failed and to prevent a plurality of storing devices from being successively failed.

In the above embodiment, the deterioration of the storing device in which the area for storing the data by the mirroring is newly secured is lower than that of the storing device in which the mirroring has been carried out. By assigning the lowest priority number to the storing device in which the area for storing the data by the mirroring is newly secured, the above storing device is prevented from being designated as the reading destination. Therefore, the difference in the degree of the deterioration between the storing devices can be caused.

In the above embodiment, a user is informed of the storing device in which the failure is detected or the occurrence of the failure is expected.

In the above embodiment, in case that the storing device in which the failure is detected or the occurrence of the failure is expected is the storing device in which the mirroring is carried out, the timing for restoring the data stored in the storing device by the mirroring to another storing device is limited to the time period in which the access to the storing device is not carried out except the access for restoring the data. That is, the access to the other data is prevented from being stopped by the restoration of the data.

According to the image forming apparatus and the method for controlling the image forming apparatus, even though one storing device is failed among at least three storing devices, the image forming apparatus can continue to be activated so as to maintain the fault tolerance and to suppress the deterioration of the productivity.

What is claimed is:

1. An image forming apparatus comprising:
at least three storing devices which are hard disk drives or solid state drives;
a detecting unit to detect a failure of one of the storing devices or to expect an occurrence of the failure of one of the storing devices; and
a control unit to control a storage of data in the storing devices,
wherein in each of all of the storing devices, a first storing area for storing the data in a division storing method in which the data is divided into blocks and the blocks are dispersively stored in all of the storing devices, is secured,
in each of at least two of the storing devices except at least one storing device, a second storing area for storing the data in a redundant storing method in which the data is redundantly stored in the two of the storing devices, is secured, and
the control unit stops the storing device in which the failure is detected or the occurrence of the failure is expected by the detection unit,
after the storing device is stopped, the control unit carries out the storage of the data in the division storing method by using all of the storing devices except the stopped storing device,
in case that the stopped storing device is a storing device for storing the data in the redundant storing method, the control unit secures the second storing area in the one storing device which is not the stopped storing device and in which the data is not stored in the redundant storing method,
the control unit copies the data stored in the second storing area of the storing device which is not the stopped storing device and in which the data is stored in the redundant storing method, to the secured second storing area of the one storing device, and
after the data is copied, the control unit carries out the storage of the data in the redundant storing method by using the secured second storing area of the one storing device and the second storing area of the storing device which is not the stopped storing device and in which the data is stored in the redundant storing method.

2. The image forming apparatus of claim 1, wherein when the control unit stops the storing device in which the failure is detected or the occurrence of the failure is expected by the detection unit, the control unit powers off only the storing device to be stopped so as to be replaceable with a new storing device even while the image forming apparatus is activated.

3. The image forming apparatus of claim 1, wherein each priority number is assigned to each of the storing devices in which the second storing area is secured, and the control unit reads the data stored in the redundant storing method from the second storing area of the storing device to which a highest priority number is assigned.

4. The image forming apparatus of claim 3, wherein when the control unit secures the second storing area in the one storing device in which the data is not stored in the redundant storing method, the control unit assigns a lowest priority number among the priority numbers to be assigned, to the one storing device.

5. The image forming apparatus of claim 1, further comprising: an informing unit to inform a user of the detected failure of the storing device or the expected occurrence of the failure when the failure of the storing device is detected or the occurrence of the failure of the storing device is expected by the detection unit.

6. The image forming apparatus of claim 1, wherein the control unit copies the data stored in the second storing area when access to the storing device is not carried out except the access for copying the data.

7. A method for controlling an image forming apparatus comprising: at least three storing devices which are hard disk drives or solid state drives; a detecting unit to detect a failure of one of the storing devices or to expect an occurrence of the failure of one of the storing devices; and a control unit to control a storage of data in the storing devices, the method comprising:

securing a first storing area for storing the data in a division storing method in which the data is divided into blocks and the blocks are dispersively stored in all of the storing devices, in each of all of the storing devices;

securing a second storing area for storing the data in a redundant storing method in which the data is redundantly stored in at least two of the storing devices, in each of the two of the storing devices except at least one storing device;

causing the control unit to stop the storing device in which the failure is detected or the occurrence of the failure is expected by the detection unit;

causing the control unit to carry out the storage of the data in the division storing method by using all of the storing devices except the stopped storing device, after the storing device is stopped;

causing the control unit to secure the second storing area in the one storing device which is not the stopped storing device and in which the data is not stored in the redundant storing method, in case that the stopped storing device is a storing device for storing the data in the redundant storing method;

causing the control unit to copy the data stored in the second storing area of the storing device which is not the stopped storing device and in which the data is stored in the redundant storing method, to the secured second storing area of the one storing device; and causing the control unit to carry out the storage of the data in the redundant storing method by using the secured second storing area of the one storing device and the second storing area of the storing device which is not the stopped storing device and in which the data is stored in the redundant storing method, after the data is copied.

8. The method of claim 7, wherein when the control unit is caused to stop the storing device in which the failure is detected or the occurrence of the failure is expected by the detection unit, the method causes the control unit to power off only the storing device to be stopped so as to be replaceable with a new storing device even while the image forming apparatus is activated.

9. The method of claim 7, wherein each priority number is assigned to each of the storing devices in which the second storing area is secured, and the method causes the control unit to read the data stored in the redundant storing method from the second storing area of the storing device having a highest priority number.

10. The method of claim 9, wherein when the control unit secures the second storing area in the one storing device in which the data is not stored in the redundant storing method, the method causes the control unit to assign a lowest priority number among the priority numbers to be assigned, to the one storing device.

11. The method of claim 7, wherein when the failure of the storing device is detected or the occurrence of the failure of the storing device is expected by the detection unit, the method causes the image forming apparatus to inform a user of the detected failure of the storing device or the expected occurrence of the failure.

12. The method of claim 7, wherein when access to the storing device is not carried out except the access for copying the data, the method causes the control unit to copy the data stored in the second storing area.

* * * * *